US007577744B2

(12) United States Patent
Heinrich et al.

(10) Patent No.: US 7,577,744 B2
(45) Date of Patent: Aug. 18, 2009

(54) METHOD AND SYSTEM FOR PREPARATION AND IMPLEMENTATION OF SERVICES FOR DATA PROCESSING UNIT

(75) Inventors: Clemens Heinrich, Berlin (DE); Henrik Koschitzki, Berlin (DE); Steffen Wittich, Berlin (DE)

(73) Assignee: Francotyp-Postalia AG & Co. KG (DE)

( * ) Notice: Subject to any disclaimer, the term of this patent is extended or adjusted under 35 U.S.C. 154(b) by 681 days.

(21) Appl. No.: 11/032,667

(22) Filed: Jan. 10, 2005

(65) Prior Publication Data

US 2005/0154610 A1 Jul. 14, 2005

(30) Foreign Application Priority Data

Jan. 9, 2004 (DE) ....................... 10 2004 001 622

(51) Int. Cl.
*G06F 15/16* (2006.01)
*G06Q 10/00* (2006.01)

(52) U.S. Cl. ...................................... 709/227; 709/203

(58) Field of Classification Search ................. 709/201, 709/202, 203, 227; 705/1
See application file for complete search history.

(56) References Cited

U.S. PATENT DOCUMENTS

| | | | | |
|---|---|---|---|---|
| 4,933,849 | A | 6/1990 | Connell et al. | |
| 5,008,827 | A * | 4/1991 | Sansone et al. | 705/409 |
| 5,606,508 | A * | 2/1997 | Thiel | 705/410 |
| 5,710,706 | A * | 1/1998 | Markl et al. | 705/409 |
| 5,852,813 | A | 12/1998 | Guenther et al. | |
| 6,035,291 | A * | 3/2000 | Thiel | 705/408 |
| 6,775,656 | B1 * | 8/2004 | Gettwart et al. | 705/401 |
| 7,103,583 | B1 * | 9/2006 | Baum et al. | 705/409 |
| 2005/0192913 | A1 * | 9/2005 | Lubart | 705/406 |
| 2005/0209875 | A1 * | 9/2005 | Bleumer et al. | 705/1 |
| 2008/0086564 | A1 * | 4/2008 | Putman et al. | 709/227 |

* cited by examiner

*Primary Examiner*—William C Vaughn, Jr.
*Assistant Examiner*—Ninos Donabed
(74) *Attorney, Agent, or Firm*—Schiff Hardin LLP

(57) ABSTRACT

In a data processing system and method for preparation of the implementation of a number of services to be implemented from a number of available services for a data processing unit (in particular a franking machine) by a remote data center, in a determining step, the sequence of the services to be implemented is determined in a first determining step initiated by a request, arriving in the data center, for a service from the data processing unit.

22 Claims, 4 Drawing Sheets

METHOD AND SYSTEM FOR PREPARATION AND IMPLEMENTATION OF SERVICES FOR DATA PROCESSING UNIT

BACKGROUND OF THE INVENTION

1. Field of the Invention

The present invention concerns a method for preparation and implementation of a number of services to be implemented from a number of available services for a data processing unit, in particular for a franking machine, via a remote data center in which the sequence of the services to be implemented is determined. The invention also concerns a corresponding data processing system.

2. Description of the Prior Art

In a number of applications, services for a data processing unit are provided and executed via a remote data center. The services can be any type by means of which an influence is exerted on the state of the data processing unit. For example, in the context of franking machines it is known to load postage from a remote data center into the franking machine, which can then use this postage for franking. As a further service, the data center normally reads out data about the use of the franking machine from the franking machine. Furthermore, the data center can influence the functioning and the operational scope of the franking machine by enabling or disenabling certain services. New software versions, new postage tables and other information for the user of the franking machine also can be loaded into the franking machine.

Loading of postage into the franking machine, as one of the available services, normally ensues at the request of the franking machine, which contacts the data center for this purpose. In the framework of this communication, further services are normally implemented that are currently appropriate for the requesting franking machine. This occurs in part automatically, without a request by the franking machine. The sequence of the services to be implemented and their mutual dependencies normally have been determined once in a determination procedure at the data center or at the franking machine.

This has the disadvantage that the determination is predetermined with a comparably rigid system for the implementation of services that can be adapted to modified boundary conditions only with very great effort. In particular, the sequence of the services to be implemented can be modified only with comparably large effort.

SUMMARY OF THE INVENTION

An object of the present invention is to provide a method and a data processing system of the above-described type that do not exhibit, or exhibit only to a lesser degree, the disadvantages cited above, and in particular that enable a flexible implementation of services.

The above object is achieved in accordance with the present invention by a method and data processing system wherein flexible preparation and implementation of services that are easily adaptable to modified boundary conditions by virtue of the determination of the sequence of the services to be implemented being initiated by a request arriving at the data center for a particular service from a data processing unit. It is thus possible to influence the sequence of the services to be implemented at arbitrary points in time.

For the requested service and further services identified as services to be implemented, a series is normally determined according to which the execution of the services ensues. It is possible that the requested (first) service may be refused. This may result in blocking of the franking machine for further operation when information exists in the data center, due to the results of a previously implemented service or from other sources, that the franking machine has possibly been manipulated.

In a first testing step of the determining procedure, compliance with at least one determining rule is preferably tested by the data processing unit. The determination of the sequence of the services to be implemented then ensues dependent on compliance with the determining rule by the data processing unit. The determining rule or rules can be an arbitrary rule or rules to be defined. Via the determining rule or rules, it is for example possible to form arbitrary categories, groups, etc. of data processing units using common features of different data processing units. For such categories, groups etc., services to be implemented and not to be implemented can then be defined without a separate determination having to individually ensue for each data processing unit. Corresponding adaptations in the specification of services to be implemented prove to be particularly simple and less complicated.

The determining rule preferably concerns the affiliation of the data processing unit with an establishing category. A separate determining rule is then provided for each further establishing category. An arbitrarily fine categorization of the data processing units is possible by means of the establishing categories, and thus a gradation of the services to be implemented is possible via the associated determining rules. Services thus can be determined that are to be implemented for all data processing units, while other services are only to be implemented for specific data processing unit classes and groups. Finally, services can be determined that are to be implemented only for a single data processing unit.

The association of the data processing unit with a specific establishing category can ensue by means of arbitrary features of the data processing unit. These features, for example, can be the type of the data processing unit, the model, the model version, or the individual serial number of the data processing unit. A gradation according to different software versions, with which the data processing unit is operated, is likewise possible.

The determining rule, however, need not necessarily be bound to features of the data processing unit. It is also possible, for example, to define temporal determining rules. Such a temporal determining rule, for example, can be complied independent of specific features of the data processing unit when the service request of the data processing unit arrives at the data center at a specific point in time.

In an embodiment of the inventive method, in a specification step preceding the testing step, a specification, as to whether the respective service is a service to be implemented or a service not to be implemented upon fulfillment of the determining rule, ensues for at least one part of the available services. Given fulfillment of the determining rule by the data processing unit, in the first testing step the selection of the services to be implemented then ensues dependent on the specification effected in the specification step. Via this specification step, a simple adaptation to modified conditions is possible. This adaptation can be triggered by arbitrary internal and external events or take into account such internal and external events.

The testing of the determining rules can be realized in any suitable manner. In the specification step a test matrix preferably is predetermined that associates, in a matrix fashion, the determining rule with at least a part of the available services. At the intersection point of the determining rule and the respective service, the test matrix has an establishing value. This establishing value is then representative of whether the service is a service to be implemented or a service not to be implemented given compliance with the determining rule by the data processing unit.

The selection of the services to be implemented in the testing step can ensue independent of the requested service, but it is also possible in the first testing step for the selection of the services to be implemented dependent on the requested first service. A particularly fine gradation of the service preparation or service implementation is thus possible.

The selection can ensue in any suitable manner dependent on the requested service. Thus, for example, different test matrices can be provided for individual services or for groups of requested services. Dependent on the requested service, the appropriate test matrix is then selected, using which the testing of the determining rules then ensues.

The selected services in principle can be brought into a corresponding series in any suitable manner. It is thus possible, for example, to simply let them be ordered in the sequence of their selection as a service to be implemented in the testing of the determining rules.

In another embodiment, a second specification ensues in the aforementioned specification step or in a second specification step for at least a part of the available services. In this second specification step, a priority value for its implementation is associated with the respective service. In a sorting step following the testing step, the sequence of the selected services to be implemented is determined dependent on the second specification. A simple and flexible control of the sequence of the services to be implemented is possible in an advantageous manner by simple variation of the priority values.

The priority values can be arbitrarily finely graduated (spaced from each other), such that a simple, unambiguous sorting is possible. Services with the same priority value are again subject to the a further sorting according to specific criteria, or alternatively services with the same priority value simply follow one another in the sequence of their selection.

The second specification can ensue at any point before the sorting step. It is particularly advantageous when it ensues before the testing step, so it can then already be taken into account (if applicable) in the rule testing, whereby the processing effort for this is reduced.

The first position in the implementation sequence can be reserved for the requested service. Preferably, however, the position of the requested service is determined dependent on a priority value assigned to this service. This is particularly useful when relationships are possible in which the requested service can be implemented only if and when other services have been previously implemented. It is likewise useful when, if applicable, other services are to be implemented in place of the requested service.

The assignment of the priority values can ensue in any suitable manner. Preferably a test matrix is also used for this purpose, similar to the that described above. Preferably therefore, in the first specification step, a test matrix is predetermined that associates at least a first determining rule with at least one part of the available services, and exhibits the priority value at the intersection point between the determining rule and the respective service. The priority value also can indicate whether a service is to be implemented at all, or not. For example, a priority value “0” can be assigned for services that are not to be implemented.

The present invention furthermore concerns a method for implementation of at least one service for a data processing unit (in particular a franking machine) by a remote data center, in which the preparation of the implementation of the service ensues with the inventive method (described above) for preparation of the implementation. The implementation of the services to be implemented ensues in a service implementation step following the determining step, dependent on the sequence determined in the in the determining step.

The implementation of the services can rigidly ensues in the determined sequence. Preferably, however, provided that the implementation of the services in the service implementation step ensues dependent on the implementation result of at least one service to be implemented. It can be determined that, in the event of the failure of a service, individual subsequent services scheduled to be implemented are not executed, or the entire sequence is interrupted. This variant can be particularly simply realized in connection with the sorting of the services according to priority values, since in such a case services whose successful completion is a requisite for the implementation of further services can be assigned a correspondingly high priority.

In a further variant of the inventive method, the determination of the sequence of services to be implemented ensues in a second determining step following the aforementioned (first) implementation step, dependent on the implementation result of at least one service to be implemented in the first implementation step. It is thus possible to automatically influence the subsequent selection of services to be implemented dependent on the success or failure of the implementation of a service. Particularly in the version described above employing the parameter matrix, an automatic variation of the parameter matrix can ensue dependent on the success or failure in the implementation of one or more services.

The present invention furthermore concerns a data processing system with at least one data processing unit (in particular a franking machine) and a remote data center, that can be placed in communication with the franking machine, that is fashioned for implementation of a number of services to be implemented in a determined sequence for the data processing unit from a number of available services. According to the invention the data center is fashioned for determination of the sequence of the services to be implemented initiated by a request, arriving at the data center, for a first service from the data processing unit.

This data processing system is suitable for the implementation of the inventive method. The variants and advantages described above in connection with the inventive method can be realized with this data processing system in the same degree.

The data center preferably has a determining unit with a first memory, in which at least one determining rule is stored, and the determining unit is fashioned to test compliance with the determining rule by the data processing unit, and to establish the sequence of the services to be implemented dependent on the compliance with the determining rule by the data processing unit. The determining rule preferably is stored in the first memory such that it can be changed, and such that it can be modified at arbitrary times.

To implement the variants of the inventive method described above with the first specification via the first rule, the determining unit is fashioned to select the services to be implemented dependent on the first specification.

To implement the variants of the inventive method described above with a test matrix and the establishing values contained therein, this test matrix preferably is stored in the first memory. The determining unit is then fashioned for selection of the services to be implemented dependent on the respective establishing value.

The determining unit preferably is fashioned for selection of the services to be implemented dependent on the requested service. To implement the variants of the inventive method described above with the specification of the priority values, the determining unit is preferably fashioned to establish the sequence of the selected services to be implemented dependent on the priority value specification.

In a preferred embodiment of the inventive data processing system, the data center has a service implementation unit, connected with the determining unit, that is fashioned to implement the services to be implemented dependent on the sequence determined by the determining unit. The service implementation unit preferably is fashioned to implement the services to be implemented in the service implementation step dependent on the implementation result of at least one service to be implemented. The data center also preferably is fashioned to establish the sequence of the services to be implemented so that some services are implemented dependent on the implementation result of at least one service to be implemented before those services.

The present invention furthermore concerns a data center for an inventive data processing system that exhibits the features described above in connection with the inventive data processing system.

DESCRIPTION OF THE PREFERRED EMBODIMENTS

Figure 1:
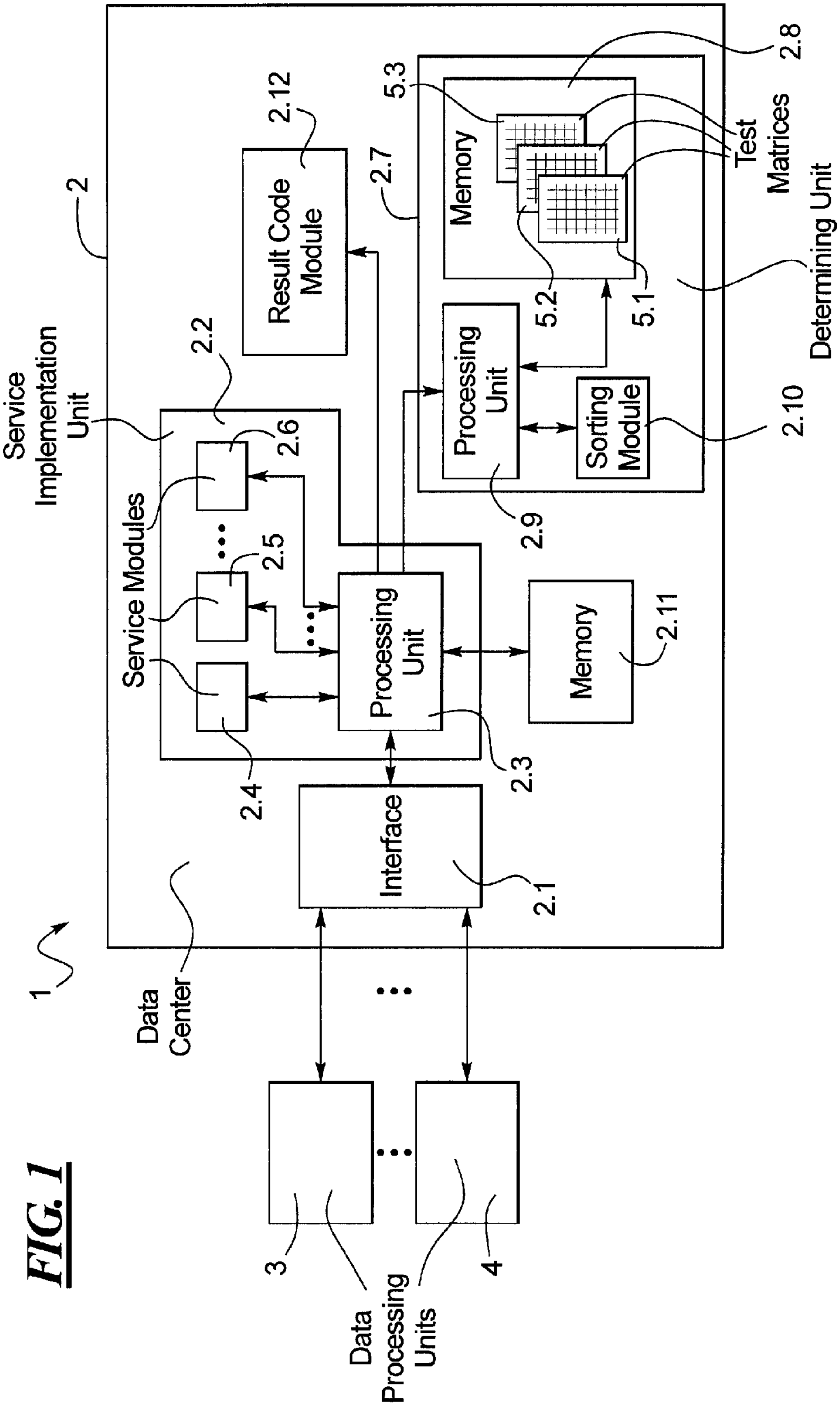
FIG. 1 schematically illustrates a preferred embodiment of the inventive data processing system for implementation of a preferred embodiment of the inventive method.

FIG. 1 is a block diagram of a preferred embodiment of the inventive data processing system 1 for implementation of a preferred embodiment of the inventive method.

The data processing system 1 includes a data center 2 and a number of data processing units disposed remote from the data center 2 in the form of franking machines, of which in FIG. 1 a first franking machine 3 and a second franking machine 4 are shown. The franking machines 3 and 4 can be connected with an interface 2.1 of the data center 2 via a suitable telecommunication connection, in order to communicate with the data center 2.

The franking machines 3 and 4 contact the data center 2 in order to request from the data center 2 the execution of one or more services for the respective franking machine 3 or 4. Such a service requested by the franking machine 3 or 4 can be, for example, loading of postage from the data center 2 into the respective franking machine 3 or 4. It can likewise be loading of other data into the respective franking machine 3 or 4, for example loading of new software, new postage rate tables, new printing format data, or other information such as, for example, advertising, etc. Furthermore, it can be the readout of specific data from the respective franking machine 3 or 4, for example readout of the register statuses as or other state data of the franking machine. Such a service can also likewise be the remote maintenance of the respective franking machine 3 or 4. The term "service" in the sense of the present invention encompasses any activity of the data center 2 via which either the state of the franking machine 3 or 4 is affected or the state of the respective franking machine 3 or 4 is determined or analyzed.

It is frequently the case that a service requested by a franking machine is linked with a series of further services to be implemented. Thus, for example for security reasons, it is a requirement for the downloading of postage into a franking machine that at least the current register statuses and, if applicable, other state data of the franking machine be read out and analyzed with regard to their integrity before new postage can be loaded.

Furthermore, it is frequently the case that, for example due to specific service contracts between the operator of a franking machine and the operator of the data center, upon request of a service by a franking machine, further unrequested services will be executed independent of the actual request, because these services are pending for execution. This can be, for example, automatic loading of new software, new postage tables, etc. into a franking machine.

To implement the available services D1 through DR, the data center 2 has a service implementation unit 2.2. This service implementation unit 2.2 includes a first processing unit 2.3 that, for implementation of the respective service, accesses service modules connected therewith, of which service modules 2.4 through 2.6 are shown in FIG. 1.

The service implementation unit 2.2 executes services to be implemented in a sequence predetermined by a selection data set. The service implementation unit 2.2 receives this selection data set from a determining unit 2.7 connected thereto, which creates the selection data set initiated by the request for a service by one of the franking machines 3 or 4.

Figure 2:
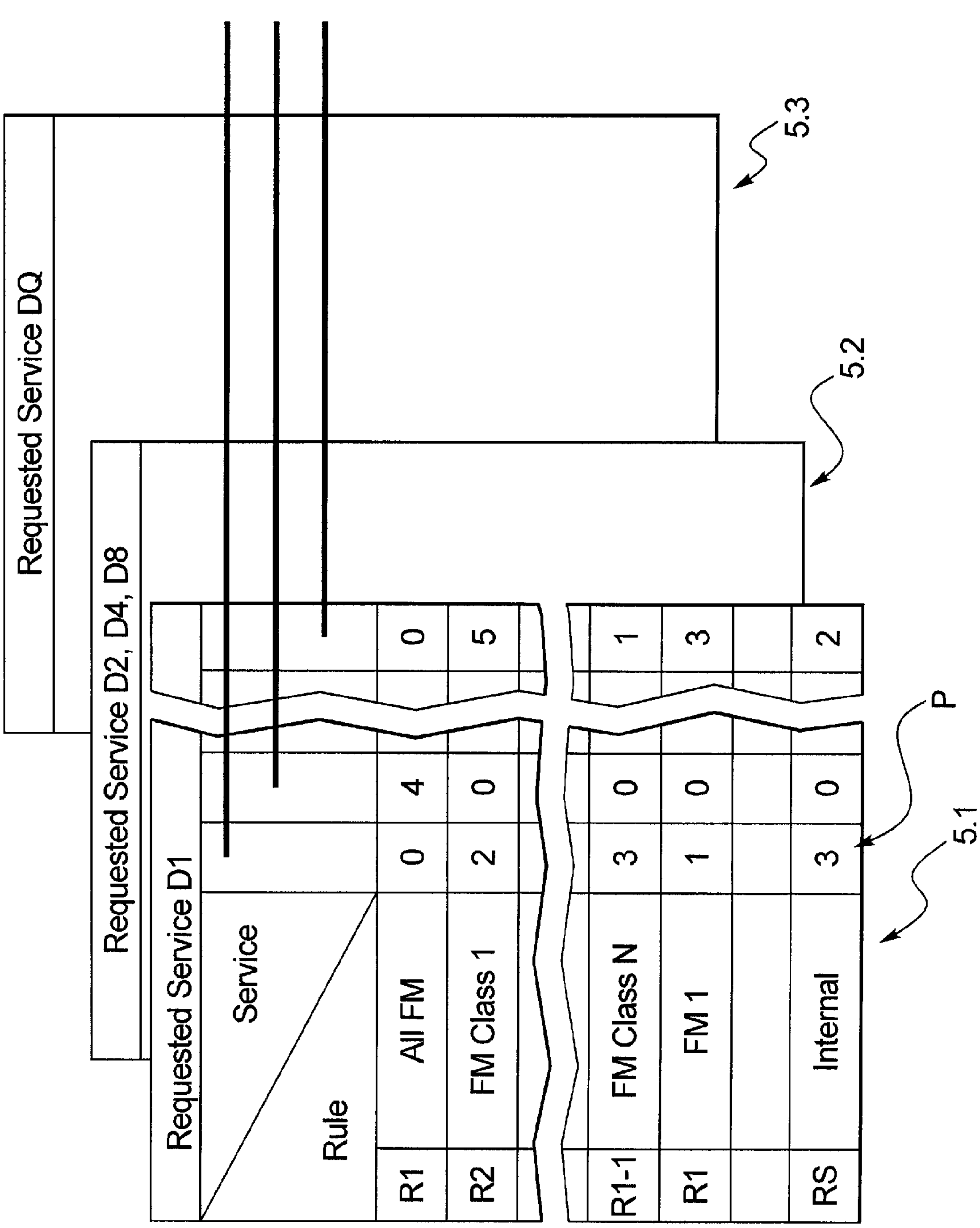
FIG. 2 schematically illustrates a test matrix for use in the embodiment of FIG. 1.
Figure 3A:
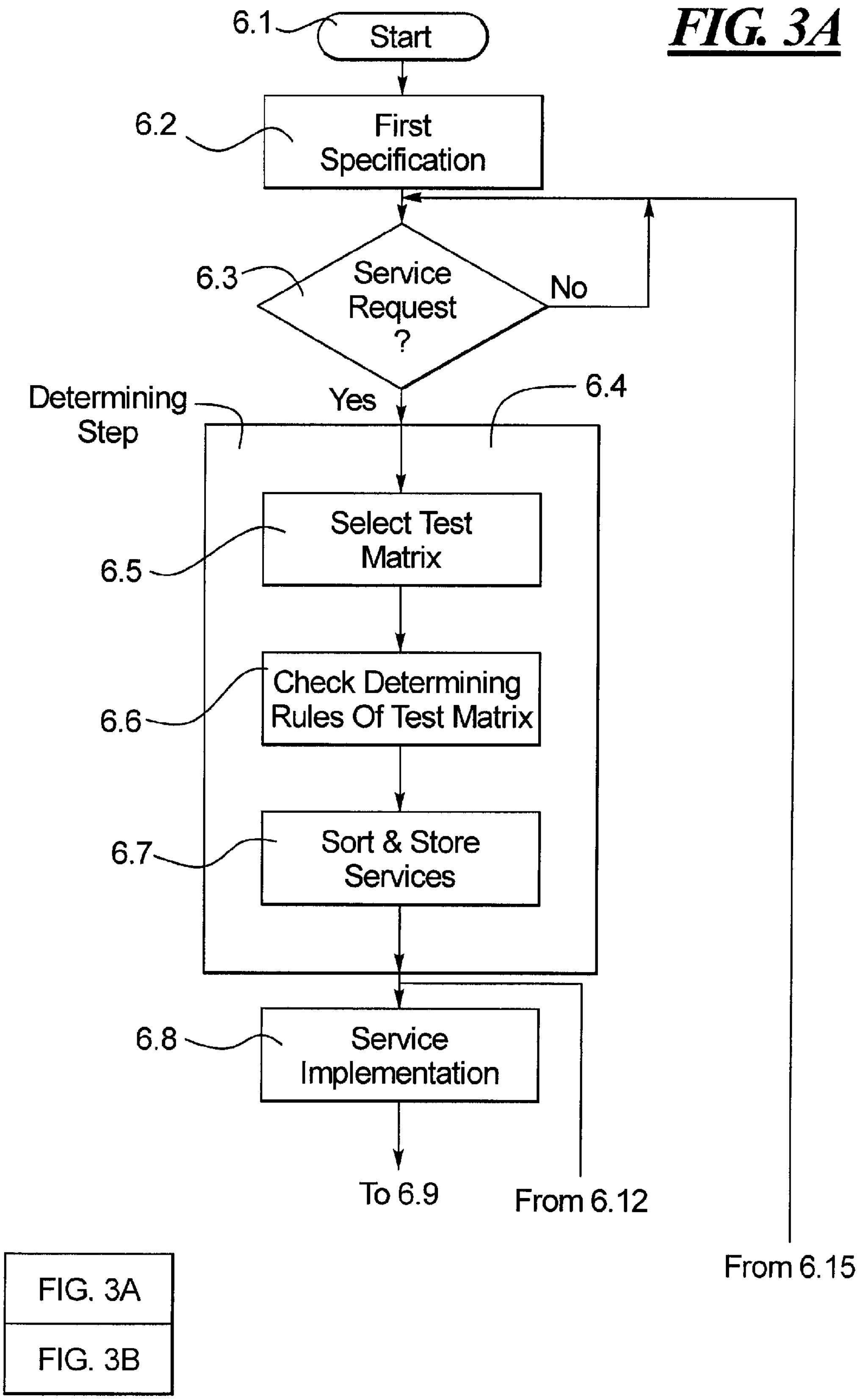
FIGS. 3A and 3B together are a flowchart for the method implemented with the data processing system of FIG. 1.
Figure 3B:
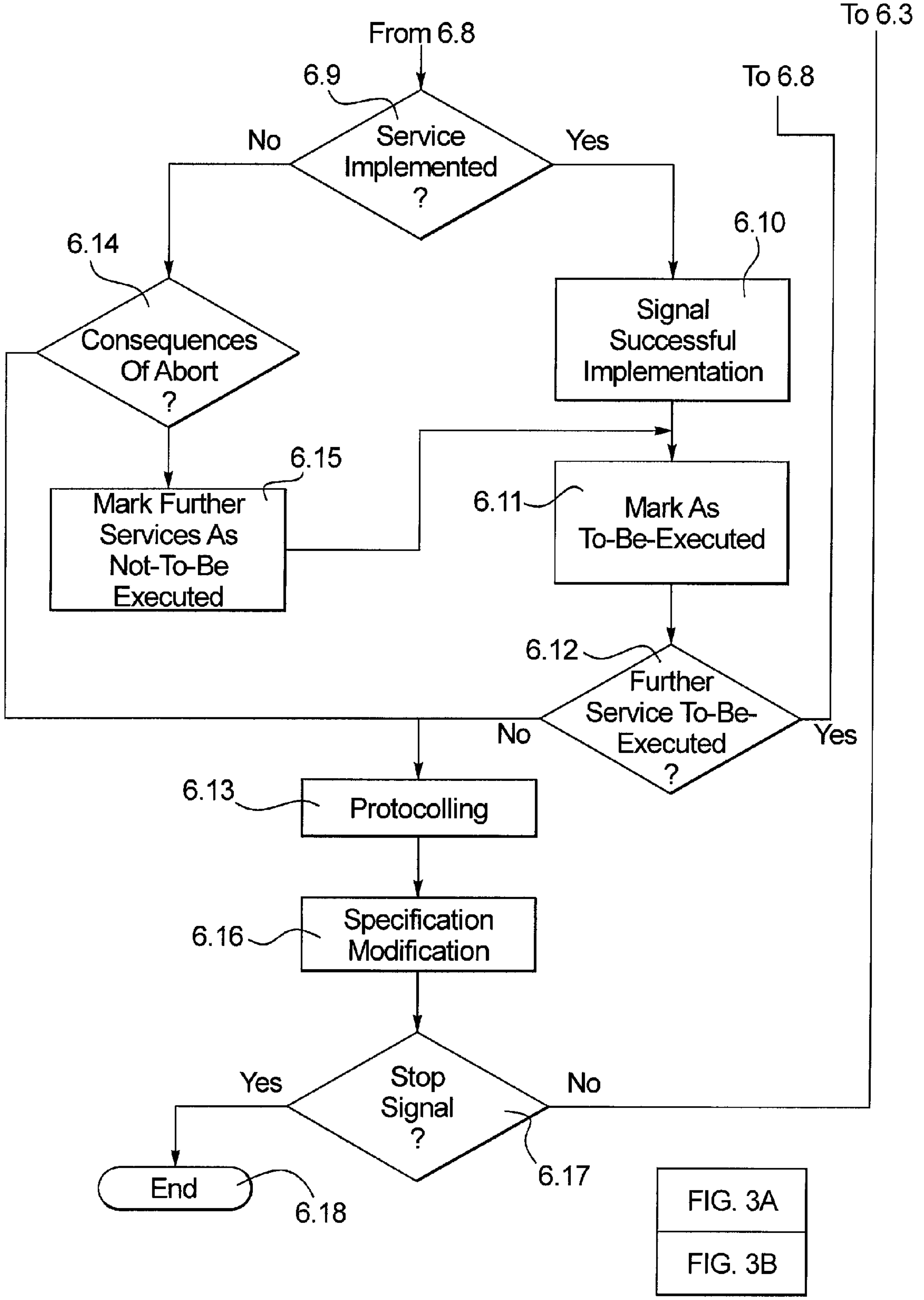

The selection data set is created using a test matrix, the functioning of which is explained in further detail below. The test matrix is selected dependent on the requested service from a number of available test matrices. The test matrices—of which only the test matrices 5.1, 5.2 and 5.3 are shown in FIGS. 1 and 2—are stored in a first storage 2.8 of the determining unit 2.7.

In the following, the implementation of the inventive method for preparation or implementation of services in the sense of the present application is described with reference to FIGS. 1 through 3A and 3B.

After the data center 2 has been activated in a step 6.1, in a first specification step 6.2 the test matrices 5.1 through 5.3 are introduced in the first memory 2.8. Each test matrix is associated with one or more requested services. The test matrix 5.1 thus is associated with the requested service D1. The test matrix 5.2 is associated with the requested services D2, D4 and D8. The test matrix 5.3 is associated with the requested service DQ.

Each test matrix associates a number of determining rules R1 through RS with a number of services. For the requested service D1, the test matrix 5.1 associates the determining rules R1 through RS with all available services D1 through DR. In contrast, for the requested services D2, D4, D8, the test matrix 5.2 associates the determining rules R1 through RS with only one part of the available services. For the requested service DQ, the test matrix 5.3 associates only one part of the determining rules R1 through RS with only one part of the available services.

The respective determining rule concerns the affiliation of the requested franking machine with a specific establishing category. The establishing categories concern the affiliation of the requested franking machine with a specific group of franking machines that is defined using specific features of the franking machine. These features are recognizable using information that is transmitted to the data center 2 with the request of the service. If the affiliation of the requested franking machines with the respective establishing category is determined, the associated determining rule is satisfied.

In the present example, the first determining rule R1 concerns the affiliation with all franking machines registered in the data center 2. The second determining rule R2 concerns the affiliation of the requesting franking machines 3 or 4 with a franking machine class 1. The further determining rules R3 through RI-1 concern the affiliation of the requesting franking machine with further franking machine classes 2 through N. These franking machine classes can be, for example, different apparatus types, different models, specific models with different configurations, for example different software versions, etc. The determining rules RI through RS-1 concern individual franking machines that are defined, for example, by their serial numbers.

The affiliation of a requesting franking machine with a specific establishing category can be determined without anything further using the serial number of the franking machine. It is therefore sufficient for the request to contain this serial number. It is also possible, however, for the request to contain any other features of the requesting franking machine, that allow the franking machine to be classified in the establishing categories.

The determining rules also can be rules that are not dependent on the requesting franking machine. Thus the determining rule RS concerns a temporal rule, i.e. the respective rule RS is fulfilled when the current request of a service arrives in the data center at a specific point in time, for example in a specific time interval (window). For example, temporally limited special actions or the like can herewith be included. Furthermore, for certain determining rules, the combined testing of franking machine-dependent and non-franking machine-dependent criteria can be provided.

A priority value P exists (i.e., is defined or set) at the intersection point between the respective determining rule and the respective service. This represents a first specification and a second specification. The first specification is specified by a priority value P>0 indicating that the appertaining service is a service to be implemented in the case of the fulfillment of the associated determining rule. If the priority value is P=0, it is determined by this priority value that the appertaining service is a service that is not to be implemented in the fulfillment of the associated determining rule. The second specification is that the number value associated with the priority value represents a measure for the priority of the respective service given fulfillment of the associated determining rule. The higher the associated number value of P, the higher the priority of the associated service.

The respective test matrix is archived in the first memory in any suitable form. It is also possible, however, for the first specification and the second specification to ensue in another suitable manner. In particular, a separation of the first and second specifications may be provided. Furthermore, for the second specification a separate second specification step can be provided.

The test matrices can be modified at any arbitrary point in time. Thus determining rules and/or services can be changed, deleted or added. Furthermore, the individual priority values can naturally be modified. The preceding modifications can depend on internal boundary conditions or events, for example the successful implementation of specific services. However, they can also depend on external boundary conditions or events, for example the communication of an external authority that concerns solvency of the operator of the franking machine. The preceding modifications naturally also can be at least partially automated. A simple and extremely flexible sequence control of the services to be implemented is hereby possible that can be adapted without problems to modified boundary conditions.

In a step 6.3 following the first specification step 6.2, it is checked whether a request by one of the franking machines 3 or 4 exists for the implementation of a service from a number of available services. If, for example, a request of the service D1 by the franking machine 3 exists, the determination of the sequence of services to be implemented thus hereby ensues initiated in a determining step 6.4.

In a step 6.5 of the determining step 6.4, the test matrix 5.1 is initially selected dependent on the requested service D1. It is thus ensured that the selection of the services to be implemented ensues dependent on the requested service. If applicable, a shortening of the operating time can be achieved since, dependent on the requested service, if applicable not all available services or rules need be executed. It is also possible for a selection to be absent dependent on the requested service. In this case, only a single test matrix can then be provided.

In a subsequent first testing step 6.6 of the determining step, the second processing unit 2.9 of the determining unit 2.7, under access to the first storage 2.8, sequentially checks all determining rules R1 through RS of the test matrix 5.1. Any services with which a priority value P>0 is associated are incorporated into the selection data set together with their associated priority value. In other words, a selection of the services to be implemented hereby ensues dependent on the previous first specification effected in the first specification step.

In a subsequent sorting step 6.7, the second processing unit 2.9 sorts the services incorporated into the selection data set by having access to a sorting module 2.10 using the priority values P associated with them. In other words, in the sorting step the sequence of the selected services to be implemented is determined dependent on the second specification. Services with numerically equal priority values P are sorted using further sorting criteria archived in the sorting module 2.10, such that the sequence of the selected services to be implemented is determined in the selection data set at the end of the sorting step 6.7. If individual services were (if applicable) selected multiple times with different priority values, the appertaining service is only classified once in the selection data set with the highest priority value associated with it.

After the selection data set thus determined has been forwarded to the service implementation unit 2.2, in the first service implementation step 6.8 the implementation ensues of the service marked as to be executed and standing at the foremost position in the selection data set. For this, the first processing unit 2,3 accesses the service module 2.4 through 2.6 associated with this service.

In a step 6.9, it is subsequently checked whether the service to be implemented has been successfully implemented. If this is the case, the signaling that the service has been successfully implemented ensues in a step 6.10. The service is then marked as not to be-executed in a step 6.11.

In a step 6.12, it is then tested whether further services marked as to be executed exist in the selection data set. If this is the case, the method jumps back to the first service implementation step 6.8. If this is not the case, in a protocolling step 6.13 the first processing unit 2.3 of the service implementation unit 2.2 protocols the result of the service implementation in a second memory 2.11 connected therewith.

By contrast, if it is determined in the step 6.9 that the service to be implemented has not been successfully implemented, in a step 6.14 the first processing unit 2.3 checks the consequences of such an abortive implementation of the appertaining service. For purpose, it accesses a result code module 2.12 connected therewith, in which a result code (that, among other things, defines the consequences of an abortive implementation of the appertaining service) is stored for every available service.

If the result code indicates that the implementation of all further services is inappropriate given a failure of the implementation of the service in question, the method immediately jumps to the protocolling step 6.13. If the result code indicates that the implementation of individual further services is inappropriate given failures of the implementation of the appertaining service, the appertaining further services (insofar as they are contained in the selection data set) are marked as not-to-be-executed in the selection data set in a step 6.15. The method subsequently jumps to the step 6.11.

In a specification modification step 6.16 following the protocolling step 6.13, if applicable an automatic modification of the test matrices is effected dependent on the protocolled result of the implementation of the services to be implemented, under access to the result code of the result code module 2.12. It is thus possible to effect automatic adaptations of the test matrix. Thus, for example, a successfully implemented service to be executed one time can be automatically provided with the priority value P=0, such that it is no longer selected given a subsequent second determining step.

In a step 6.17, it is then tested whether a stop signal exists to end the operation of the data center 2. If this is the case, the operation ends in a step 6.18. Otherwise the operation is continued and the method jumps to step 6.3.

The present invention has been described using the example of franking machines, however, it can also be used in connection with any other data processing units for which a remote data center executes specific services.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for preparing for implementation of a plurality of linked services, from among a plurality of available services, to be implemented for a data processing unit, comprising the steps of:

establishing a communication session between a data processing unit and a data center remote from said data processing unit;

in said communication session, making a request to the data center from the data processing unit for a requested service to be implemented for the data processing unit, and including in said communication session a specification associated with said data processing unit;

upon receipt of said request and said specification at said data center, automatically electronically identifying said requested service and at least one further service, from among said plurality of available services, that is linked to said requested service according to predetermined linking criteria, said requested service and said at least one further service forming linked services, and automatically electronically selecting, dependent on said specification that is included in said communication session, a sequence, from among different possible sequences, that said linked services will be implemented for the data processing unit that made said request; and in said communication session, transmitting data from the data center to the data processing unit that cause said linked services to be implemented for said data processing unit in the selected sequence; wherein the step of determining said sequence of services at the data center comprises executing a test at said data center, using a determining rule, dependent on said specification, that affiliates said data processing unit with at least one service in said plurality of available services, and determining said sequence of services dependent on fulfillment of said determining rule;

wherein before testing for fulfillment of said determining rule: executing a permissibility test at said data center that determines whether a candidate service, from among said plurality of available services, is permissible for inclusion in said sequence of services upon fulfillment of said determining rule or is not permissible for inclusion in said sequence of linked services upon fulfillment of said determining rule; and upon fulfillment of said determining rule, including or not including said candidate service in said sequence of linked services dependent on said permissibility test.

2. A method as claimed in claim 1 comprising testing, using said determining rule, affiliation of the data processing unit making said request with a predetermined category.

3. A method as claimed in claim 1 comprising testing, using said determining rule, satisfaction of a criterion independent of the data processing unit making said request.

4. A method as claimed in claim 1 comprising, for said permissibility test, determining a test matrix that associates an establishing rule with at least some of said available services and that exhibits a determining value at an intersection between said determining rule and said candidate service, said determining value representing whether said candidate service is permissible for inclusion in said sequence of linked services upon fulfillment of said determining rule or is not permissible for inclusion and said sequence of linked services upon fulfillment of said determining rule.

5. A method as claimed in claim 4 comprising, before executing said permissibility test:

for each candidate service, assigning said candidate service a priority value; and after executing said permissibility test for each candidate service, sorting the respective services dependent on the priority values for each candidate service that is permissible for inclusion in said sequence of linked services, and ordering said services in said sequence of linked services dependent on the respective priority values.

6. A method as claimed in claim 5 comprising assigning said priority values using said test matrix, with the respective determining values also serving as the respective priority values.

7. A method as claimed in claim 1 comprising conducting said permissibility test dependent on said requested service.

8. A method as claimed in claim 1 comprising, before executing said permissibility test: for each candidate service, assigning said candidate service a priority value; and after executing said permissibility test for each candidate service, sorting the respective services dependent on the priority values for each candidate service that is permissible for inclusion in said sequence of services, and ordering said linked services in said sequence of services dependent on the respective priority values.

9. A method as claimed in claim 8 comprising assigning said priority values using a matrix that associates said determining rule with at least some of said plurality of available services and exhibits the respective priority values at respective intersection points between said determining rule and the respective available services.

10. A method as claimed in claim 1 comprising implementing subsequent services in said sequence of linked services dependent on a success or failure of an earlier service in said sequence of linked services, preceding said subsequent services.

11. A method as claimed in claim 1 wherein said data processing unit has a unique serial number associated therewith, and comprising, in said communication session, transmitting said serial number for said data processing unit as said specification.

12. A method as claimed in claim 1 comprising transmitting said request for a requested service and said specification in a single communication in said communication session.

13. A method as claimed in claim 1 comprising transmitting said request for a requested service and said specification respectively in separate, successive communications in said communication session.

14. A data processing system for preparing for implementation of a plurality of linked services, from among a plurality of available services, to be implemented for a data processing unit, comprising:

a data processing unit and a data center remote therefrom a communication arrangement configured to establish a communication session between said data processing unit and a data center remote;

said data processing unit being configured to make, in said communication session, a request to the data center for a requested service to be implemented for the data processing unit, and including in said communication session a specification associated with said data processing unit; said data center comprising a determining unit configured to identify, upon receipt of said request, said requested service and at least one further service, from among said plurality of available services, linked to said requested service according to predetermined linking criteria, said requested service and said at least one further service forming linked services, and to select, dependent on said specification that is included in said communication session, a sequence, from among different possible sequences, that said linked services will be implemented for the data processing unit that made said request, and said data center comprising a transmission unit configured to transmit data from the data center to the processing unit that cause said linked services to be implemented for said data processing unit in said the selected sequence; wherein said determining unit is configured to execute a test using a determining rule, dependent on said specification, that affiliates said data processing unit with at least one service in said plurality of available services, and to determine said sequence of linked services dependent on fulfillment of said determining rule; wherein said determining unit is configured to execute, before testing for fulfillment of said determining rule, a permissibility test that determines whether a candidate service, from among said plurality of available services, is permissible for inclusion in said sequence of linked services upon fulfillment of said determining rule or is not permissible for inclusion in said sequence of linked services upon fulfillment of said determining rule, and upon fulfillment of said determining rule, includes or does not include said candidate service in said sequence of linked services dependent on said permissibility test.

15. A data processing system as claimed in claim 14 wherein said determining unit is configured to test, using said determining rule, affiliation of the data processing unit making said request with a predetermined category.

16. A data processing system as claimed in claim 14 wherein said determining unit is configured to test, using said determining rule, satisfaction of a criterion independent of the data processing unit making said request.

17. A data processing system as claimed in claim 14 wherein said determining unit is configured to access, for said permissibility test, contains a memory having a test matrix stored therein that associates an establishing rule with at least some of said available services and that exhibits a determining value at an intersection between said determining rule and said candidate service, said determining value representing whether said service is permissible for inclusion in said sequence of services upon fulfillment of said determining rule or is not permissible for inclusion and said sequence of services upon fulfillment of said determining rule.

18. A data processing system as claimed in claim 17 wherein said determining unit is configured to assign before executing said permissibility test, each candidate service a priority value, and after executing said permissibility test for each candidate service, to sort the respective services dependent on the priority values for each candidate service that is permissible for inclusion in said sequence of services, and to order said services in said sequence of linked services dependent on the respective priority values.

19. A data processing system as claimed in claim 18 wherein said determining unit is configured to assign said priority values using said test matrix, with the respective determining values also serving as the respective priority values.

20. A data processing system as claimed in claim 14 wherein said determining unit is configured to conduct said permissibility test dependent on said requested service.

21. A data processing system as claimed in claim 14 wherein said determining unit is configured to assign, before executing said permissibility test, each candidate service a priority value, and after executing said permissibility test for each candidate service, to sort the respective services dependent on the priority values for each candidate service that is permissible for inclusion in said sequence of linked services, and to order said services in said sequence of services dependent on the respective priority values.

22. A data processing system as claimed in claim 21 wherein said determining unit is configured to assign said priority values using a stored matrix that associates said determining rule with at least some of said plurality of available services and exhibits the respective priority values at respective intersection points between said determining rule and the respective available services.

* * * * *